M. W. PARRISH.
GALVANIC BATTERY.
No. 189,779. Patented April 17, 1877.
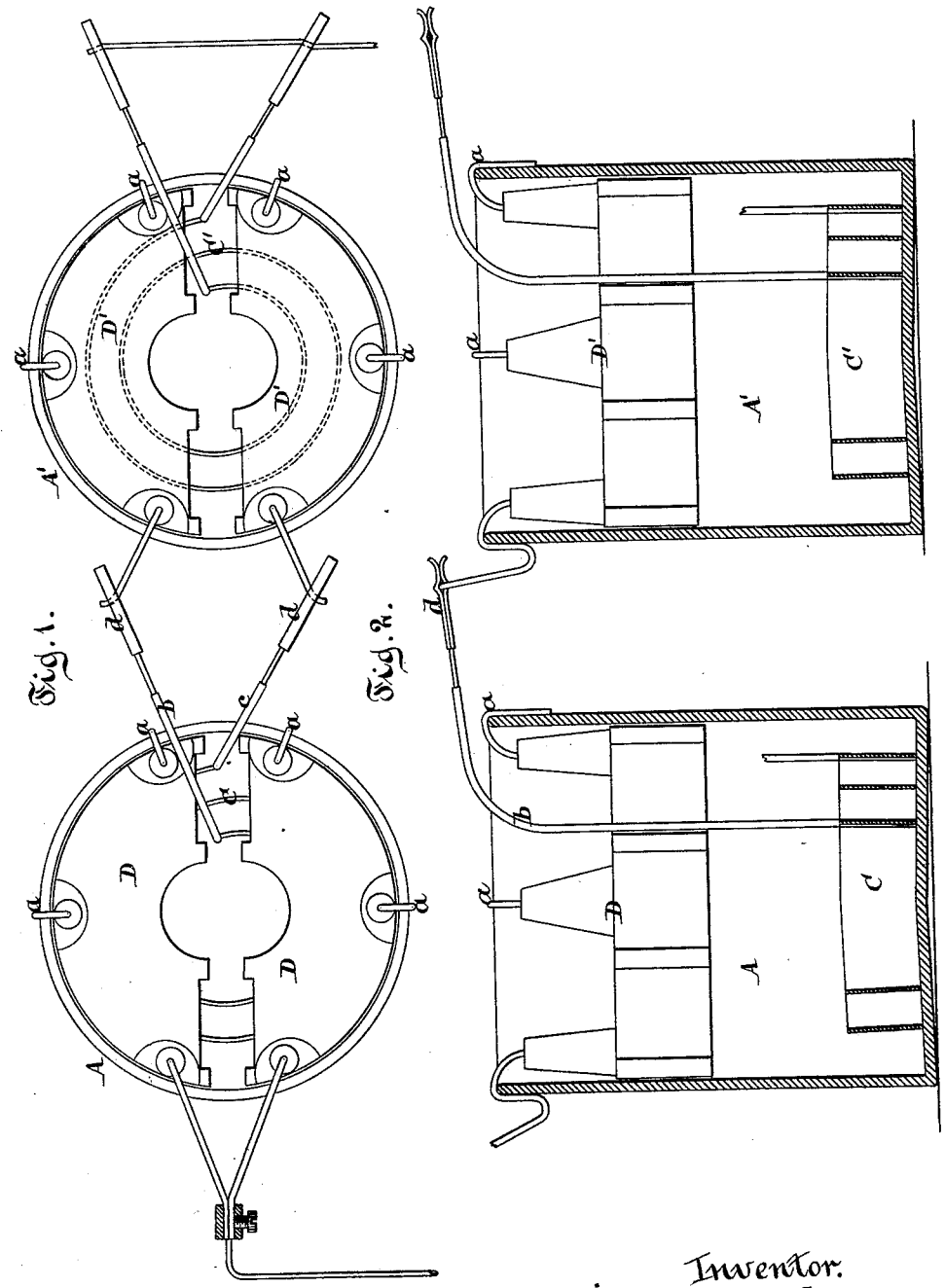
Witnesses.
Inventor.

UNITED STATES PATENT OFFICE.

MYRON W. PARRISH, OF JACKSON, MICHIGAN.

IMPROVEMENT IN GALVANIC BATTERIES.

Specification forming part of Letters Patent No. 189,779, dated April 17, 1877; application filed January 11, 1877.

*To all whom it may concern:*

Be it known that I, MYRON W. PARRISH, of Jackson, in the county of Jackson and State of Michigan, have invented a new and useful Improvement in Galvanic Batteries, which invention is fully set forth in the following specification, reference being had to the accompanying drawing, in which—

Figure 1 represents a plan or top view. Fig. 2 is a vertical section.

Similar letters indicate corresponding parts.

This invention relates to a galvanic battery in which a double connection is made between the positive element of one cell and the negative element of the next succeeding cell, so that if one connection becomes broken the circuit still remains in force, and the broken connection can be repaired at leisure. The negative or zinc element of each cell in my battery is made in two or more sections, each of which is connected to the positive or copper element of the succeeding cell, so that each section of the negative element can be removed and cleaned without interrupting the operation of the battery.

In the drawing, the letters A A' designate the jars of two adjoining cells of my battery. In each of these jars is contained an electro-positive or copper element, C or C', and an electro-negative or zinc element, D or D', the copper elements being, by preference, made in the form of convolute springs, which are placed on the bottom of the jars, while the zinc elements are suspended from the edges of the jars by means of wires $a$. From the ends of the copper element C extend wires $b$ $c$, both of which are connected to the zinc element D' of the succeeding jar A', so that a double connection is obtained between the different elements of the succeeding cells.

The zinc elements D D' are made each in two or more sections, and the copper element C of the first cell connects by the wire $b$ with one of the zinc sections of the next cell, and, by means of the wire $c$, with the other section, so that each of the zinc sections can be taken out, for the purpose of cleaning, or otherwise, without interrupting the operations of the battery.

For the purpose of connecting the copper elements with the zinc elements of the succeeding cells I use spring-catches $d$, the jaws of which are bent as shown in Fig. 2, so that by pressing them over the wires secured to the elements to which the connection is to be made, they open readily, and then they close upon said wires and produce a safe connection, which is not liable to work loose spontaneously. The ordinary method of making connections between the wires of the galvanic batteries is by means of binding-screws, and it happens frequently that these screws work loose, and the operation of the battery is interrupted. Such accidents cannot happen with my spring-clamps; and, furthermore, my spring-clamps allow of making and breaking the connections more readily than such can be done by means of binding-screws.

In the drawings I have also shown the connection of my battery with the line-wires, which can be made either by means of binding-screws or by means of my spring-catches.

What I claim as new, and desire to secure by Letters Patent, is—

1. In a galvanic battery composed of several cells, the combination of a double connection with the positive element of one cell and the negative element of the succeeding cell, substantially as and for the purpose shown and described.

2. The combination, with the jar of a galvanic battery and with the positive element contained therein, of a negative element made in two sections, substantially as and for the purpose set forth.

In testimony that I claim the foregoing I have hereunto set my hand and seal this 20th day of December, 1876.

MYRON W. PARRISH. [L. S.]

Witnesses:
 W. HAUFF,
 E. F. KASTENHUBER.